United States Patent [19]

Bocquet

[11] 4,245,585
[45] Jan. 20, 1981

[54] APPARATUS FOR RECOATING SURFACES OF A THERMOPLASTIC MATERIAL

[75] Inventor: Jean P. Bocquet, Bissy Chambery, France

[73] Assignee: Societé SKID, Chambéry, France

[21] Appl. No.: 904,256

[22] Filed: May 9, 1978

[30] Foreign Application Priority Data

May 17, 1977 [FR] France .................. 77 15139

[51] Int. Cl.³ ............................................. A63C 11/07
[52] U.S. Cl. .................................. 118/410; 118/202; 118/415; 401/2
[58] Field of Search .................. 118/407, 5, 410, 76, 118/202, 415; 219/230, 421; 401/1–3

[56] References Cited

U.S. PATENT DOCUMENTS

| | | | |
|---|---|---|---|
| 1,312,347 | 8/1919 | Ogden | 401/2 |
| 1,449,517 | 3/1923 | Lame | 401/2 |
| 2,111,865 | 3/1938 | MacKenzie | 118/410 X |
| 2,432,428 | 12/1947 | Lang | 219/230 X |
| 2,681,685 | 6/1954 | Arkless | 401/1 X |
| 2,783,735 | 3/1957 | Paulsen | 118/410 |
| 3,056,337 | 10/1962 | Bahr et al. | 118/410 X |
| 3,950,105 | 4/1976 | Moss et al. | 401/1 |
| 3,988,070 | 10/1976 | Tobler et al. | 401/2 |
| 4,065,214 | 12/1977 | Daum et al. | 401/2 |
| 4,118,130 | 10/1978 | Kasubke | 401/2 |

FOREIGN PATENT DOCUMENTS 1243802 9/1960 France ............................ 118/410

Primary Examiner—Ralph S. Kendall
Attorney, Agent, or Firm—Miller & Prestia

[57] ABSTRACT

An apparatus for recoating a thermoplastic surface with a thermoplastic material which comprises means for continuously supplying thermoplastic material in a solid state, heating and spreading means for coating said thermoplastic material in a molten state on said thermoplastic surface to be coated, said heating and spreading means comprising a metallic heating body having heating resistor means and at least one transversing passageway for said thermoplastic material, said passageway having an inlet for introducing said thermoplastic material in a solid state and an opposite outlet, and a projection found on said heating and spreading means at the outlet for spreading said molten thermoplastic material, said projection leaving a contoured contacting surface extending at an angle to said passageway for contacting the surface to be recoated.

2 Claims, 3 Drawing Figures

APPARATUS FOR RECOATING SURFACES OF A THERMOPLASTIC MATERIAL

FIELD OF THE INVENTION

The present invention relates to a method and an apparatus for recoating by the surfaces of thermoplastic material by sweeping, more particularly for recoating skibases.

The wide utilization of thermoplastic resins as working coatings has led to the development of apparatus for carrying out repair and renewal of said thermoplastic coating material so as to have the surface condition thereof restored, free of roughness or cracks, whereby said coatings recover their initial mechanical properties.

More particularly, in the ski field, where wear and numerous bruises occur on skibases made of polyethylene, retarding the sliding thereof, more particularly with respect to competition skis, recoating techniques have been developed for restituting to said skibases the initial finished surface condition thereof without the necessity for the complete removal of said skibases or having the same substituted by new bases.

DESCRIPTION OF THE PRIOR ART

The method usually carried out therefore consists in recoating the skibase by depositing thereon a film of thermoplastic material identical to the material of the skibase, generally polyethylene, by means of an apparatus for supplying a flow of hot air which serves both to soften the material of the skibase and the material to be deposited thereon and to promote their blending when a determined pressure is exerted thereon. Drawbacks of such an apparatus reside in the important energy consumption which is required due to thermal losses in blowing hot air and in the difficulties to obtain a perfectly localized heating of a portion of the skibase which may result in distortions thereof. Moreover, scattering of hot air streams makes it difficult to practically use such apparatus as hand-tools.

According to another known method, use is made of an apparatus wherein the thermoplastic material is previously heated to its softening temperature and supplied in a liquid state by a gear pump or a feed screw to a nozzle for applying the liquid material onto the surface to be renewed. The drawbacks of such an apparatus reside in the high thermal inertia thereof, so as to result in time consumption for the starting operation and in reduced possibilities of controlling the temperature at the level of the application nozzle, so that alternative treatments of skis having different qualities and properties are difficult to be carried out. Moreover, the requirement of keeping a predetermined mass of polyethylene at its melting temperature results in relatively significant energy consumption and may eventually result in modifications of the properties of the polyethylene material. Additionnally, when it is required to successively make use of polyethylene materials having different colors, dead times are important since it is required to carefully clean the apparatus before introducing a material of a different color.

OBJECT OF THE INVENTION

There is an object of the present invention to obviate such drawbacks by providing a recoating method which is easily carried out, which permits a precise control of the temperature and a controlled heating to accurately determine zones to be recoated and thereby permitting a great reduction in energy consumption for recoating a given surface.

Another object of the invention is to provide a method of recoating which can be carried out by an apparatus of small overall dimensions which can be efficiently used as a hand-tool.

Another object of the invention is to provide a recoating method wherein use is made of a thermoplastic material to be deposited, for instance polyethylene, in a solid state, more particularly in the form of filaments or film, thereby providing the improved flexibility and allowing an immediate interchangeability of the materials to be utilized, more particularly with respect to successive materials having different colors.

SUMMARY OF THE INVENTION

In order to meet these objects, and others, the method of recoating by sweeping surfaces of thermoplastic material consists in continuously mechanically supplying the thermoplastic material to be deposited in a solid state through a heating body, where the thermoplastic material is brought to a softened state, said body being shaped so as to provide a shoe for spreading the material to be deposited and for preheating the surface to be recoated.

According to another feature of the present invention, a recoating apparatus for carrying out the method of the invention comprises means for supplying the thermoplastic material to be deposited, heating means and extruding means for spreading the material to be deposited onto a surface to be recoated, said heating means comprising a metallic heating body including heating resistor means and at least a transversing passageway for the thermoplastic material, said thermoplastic material to be deposited being continuously introduced at one end of said passageway in a solid state, the other end of said passageway communicating with a spreading structure formed by a projection of the heating body presenting a shaped contacting surface for contacting the surface to be recoated.

According to another feature of the present invention, the thermoplastic material to be applied is supplied in the form of unreeled filaments, the passageways within the heating body being straight bores, the filaments being mechanically continuously introduced within the heating body by selectively controlled mechanical driving means.

BRIEF DESCRIPTION OF THE DRAWINGS

Further objects, advantages and capabilities of the invention will more fully appear from the following description of preferred embodiments, made in connection with the accompanying drawings, in which:

FIG. 3 is a perspective view of another embodiment of the recoating apparatus of the present invention.

DETAILED DESCRIPTION OF THE DRAWINGS

Figure 1:
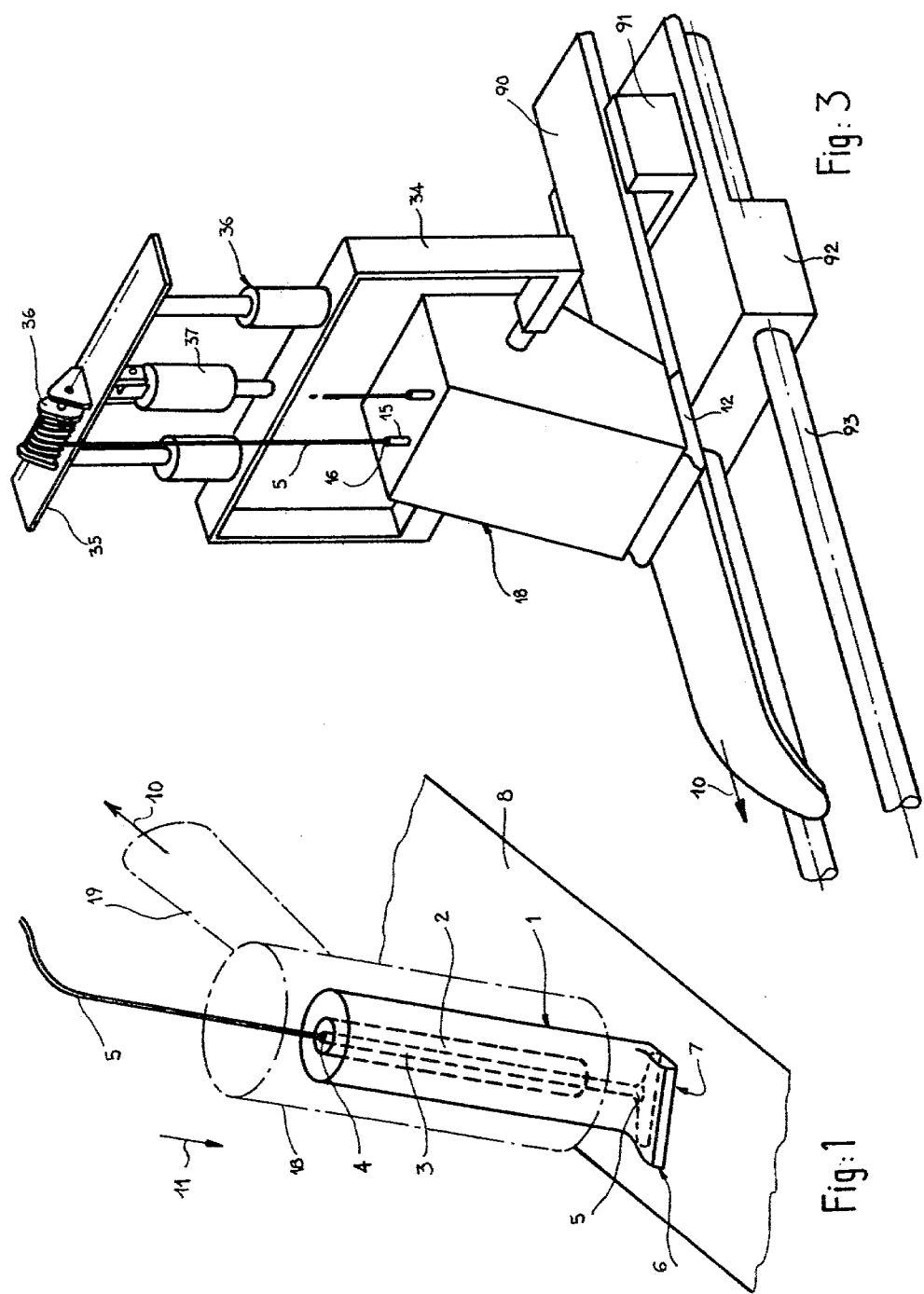
FIG. 1 schematically shows a recoating apparatus for carrying out the method of the invention.

The recoating apparatus schematically shown in FIG. 1, substantially comprises a heating body, generally designated by reference numeral 1, made of a thermoconducting metal, within which is disposed a heating cartridge, generally designated by reference numeral 2, encompassing a pattern of electrical resistors. A passageway 3 goes longitudinally entirely through the heating body 1, said passageway being disposed adjacent the heating cartridge 2 or extending coaxially therein. In the upper end 4 of passageway 3 is introduced the recoating supply thermoplastic material, preferably a filament of polyethylene or the like, generally designated by reference numeral 5, unreeled from a supplying reel (not shown). The other end or lower end 4' of the passageway 3 widens out in a spreading or distributing shoe 6 formed by an extension or projection of the heating body 1, said shoe having a shaped lower outer surface 7, for example a flat surface, for cooperation during the recoating operation with the surface 8 to be recoated. A casing 18, shown in dash-dotted lines, serves for thermal insulation and for the handling of the apparatus, for example by means of a handle 19.

With such an apparatus, when connecting the heating cartridge 2 to an electrical power supply (not shown), the whole heating body has its temperature raised to a temperature substantially corresponding to the softening temperature of the thermoplastic material to be deposited, whereby the shoe 6 thermally connected to the heating body and advantageously made of a single piece therewith is brought to a temperature lower than the maximum temperature within the passageway 3. Thus, the polyethylene filament 5 is introduced in a solid state through the upper opening 4 of the passageway 2 is, progressively softened and melted along the passageway 3 and reaches the lower end 4' of said passageway while still in a molten state, whereby the liquid material may be accordingly crushed and distributed under the application shoe 6 which simultaneously serves to preheat the member, e.g. the ski, on the surface 8 of which the extruded polyethylene is thus applied. The dimensions of the passageway 3 are determined so as to correspond substantially to the dimensions of the solid thermoplastic material introduced therein; progression of softening of said material within the passageway 3 allows, through mechanical pushing, for example either directly with the hand or by a mechanical one-way driving means actuated by a trigger device, to continuously introduce a thermoplastic filament 5 within the apparatus, the down-stream or upper solid portions of said filament being rigid enough and guided within the passageway 3 to drive downwardly the upstream or lower softened portions of said filament so as to cause the same to be spread out on the surface 8 through a sweeping movement between the apparatus and said surface. Illustrated by arrow 10, the extruded thermoplastic material is laminated as a result of both said sweeping movement and the pressure exerted on the apparatus in the direction shown by arrow 11, i.e. substantially perpendicular to the contact plane between shoe 6 with the surface 8, in the case of a flat surface to be coated.

It will be understood that dimensioning of the heating cartridge 2 is necessary in order to obtain the softening and melting of the thermoplastic material and the absence of movable parts, as also the focusing of the heat generated by the heating cartridge at the vicinity of the axis of the heating body permits the building of a portable apparatus in the form of a gun, which is easy to operate and efficient. Such a repair gun permitting, due to the weak thermal inertia of the heating body, permits use in a short period of localized or extensive repairs on a surface of a thermoplastic material to be renewed or recoated. Moreover, direct interchangeability of thermoplastic filaments 5 allow one to rapidly modify the thermoplastic material to be supplied, depending on the various colors of the surface 8 to be treated.

Figure 2:
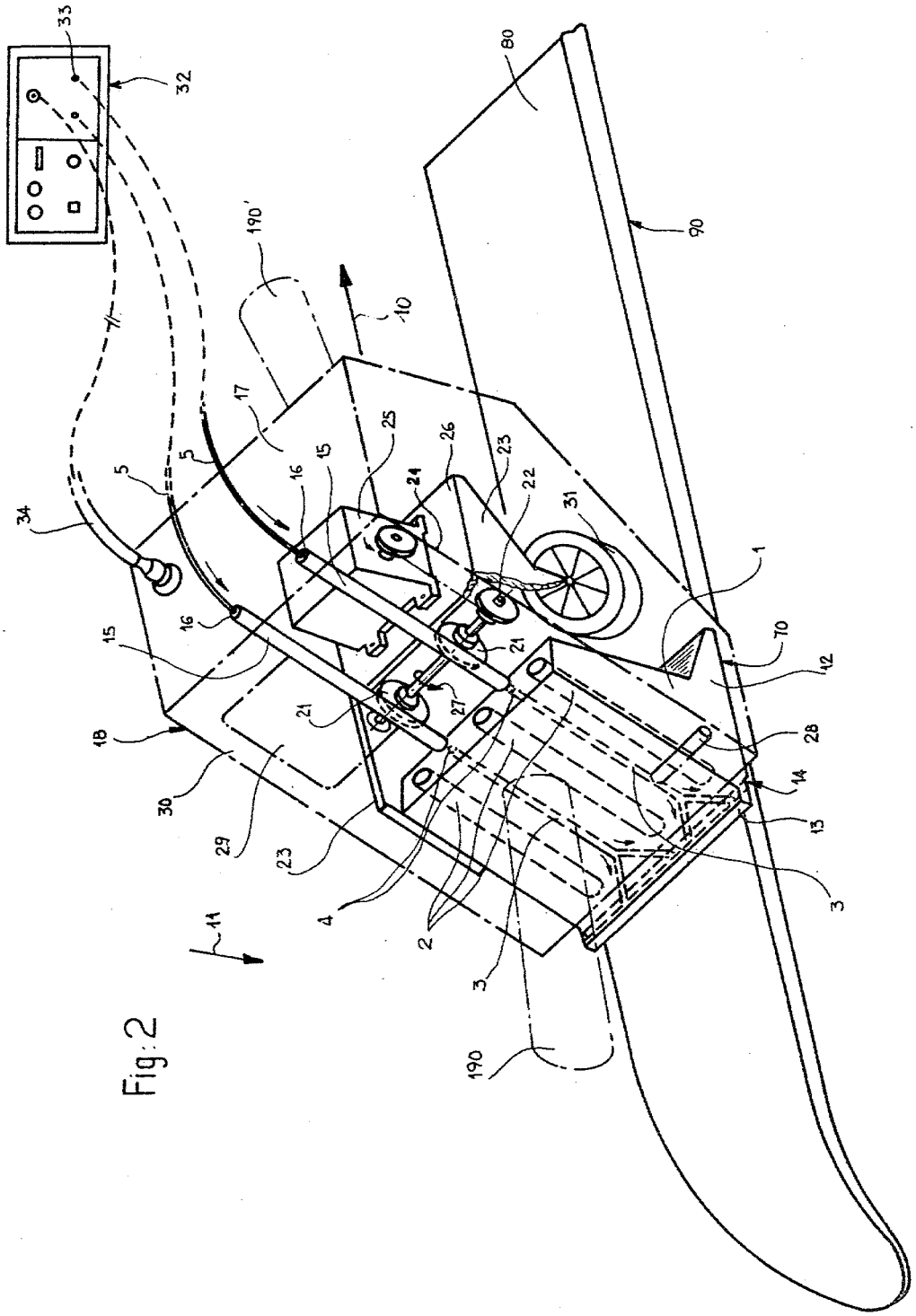
FIG. 2 is a perspective view, partially broken, of an embodiment of the recoating apparatus utilizable as a hand-tool.

In FIG. 2, is shown an embodiment of a repair gun in the position of recoating a skibase. The apparatus shown in FIG. 2 comprises a heating body 1, of a substantially diedric shape, comprising a plurality of heating cartridges 2, preferably three in number, and two passageways 3 for the thermoplastic material to be supplied in the form of filaments, said passageways extending parallel to the heating cartridges 2, each passageway being disposed between two adjacent heating cartridges. The lower wing 12 of the heating body 1, which forms the heating and spreading shoe, has a flat lower face 70, the width of which is slightly greater than the usual maximal width of a ski 90. Adjacent the leading edge 13 of the heating body 1 is formed a transversal groove 14 which extends all over the width of the lower face 70 of the heating body 1. Lower ends of passageways 2 each divide into two angularly spaced extruding channels 20 and 20' which extend substantially in the plane common to the two passageways 3 and which open into the groove 14 which serves as a receiving and spreading channel for the molten thermoplastic material to be applied on the skibase 80 of the ski 90.

Above the inlet or upper openings 4 of the passageways 3 are disposed two guiding and supplying bushes 15 in the shape of cylindrical tubes extending coaxially to the passageways 3 and opening at their upper ends 16 beyond the upper wall 17 of the casing structure 18 shown in dash-dotted lines, said upper ends 16 constituting the inlets through which the polyethylene filaments 5 are introduced within the apparatus.

The wall of each guiding bush 15 is locally cut out with an opening or slot (not shown) through which extends a peripheral portion of a driving member comprised by a toothed wheel 21 in such a manner that the teeth of said wheel partially protrudes within the inner space defined by the guiding bushes 15. Toothed wheels 21 are on a common axis 22 mounted for rotation between flanges 23 secured to the heating body 1, said axis being driven, through a clutch 24, by a speed reducing driving unit 25 mounted on a frame 26 supported by the flanges 28. The distance the toothed segments of the toothed wheels 21 project within the guiding bushes 15 is determined so that the distance between the outer diameter of the toothed segments of said wheels and the opposite internal wall of said bushes is slightly lesser than the nominal diameter of the filaments of polyethylene 5, whereby, when said filaments are manually introduced through inlets 16 within the bushes 15, the leading edges of the filaments are jammed between the wheels 21 and the inner wall of said bushes 15 so that, when connecting the driving unit 25 to an electrical power unit (not shown), the rotation, in the direction of arrow 27, of the driven toothed wheel 21 causes the filaments 5 to be driven along the bushes 16 and the passageways 3 toward the distributing groove 14.

A thermocouple 28, for instance, of a copper-constantan type, is embedded within the heating body 1 and is connected to a measuring device (not shown) providing a display, such as a digital display, of the temperature of the heating body, the display device being preferably mounted adjacent a display window (29) provided in the front face 30 of the casing 18 so as to be controlled, for example, by means of powerstats (not shown). The electrical power supplied to the heating cartridges 2 depends on the thermoplastic materials to be treated and/or the physical characteristics of the skibases to be recoated. A cooling fan 31 is connected to the driving unit 25 and is actuated manually or by a thermostat that is disposed in the lower part of the casing 18 for achieving a thermal balance within the apparatus. The casing is provided with two opposite handles 190 and 190' for handling and operating the apparatus in the direction of arrow 10 with respect to the stationary skibase 80.

According to a preferred embodiment of the present invention, the apparatus as above described is operated in connection with a service box or compartment, generally designated by reference numeral 32, containing the supply reels for the polyethylene filaments, said filaments being extracted through supplying openings 33 in the front wall of the compartment. The whole set of control and measure devices for controlling the recoating apparatus and also the electric power source are arranged within said compartment 32, connection between the apparatus and said devices being made by a multi-channel cable 34. The driving unit 25 is selectively actuated by a trigger (not shown) mounted on one of the handles 190, 190'. The thermocouple 28 may be coupled to an electronic regulating device which not only displays the temperature of the heating body but also eventually regulates the electric power transmitted to the heating cartridges, so as to automatically and accurately set and control the temperature of the heating body and, accordingly, of the laminating distributing shoe.

As shown in the schematic embodiment in FIG. 1, the polyethylene filaments 5 are continuously driven by the toothed wheels 21 projecting within the guiding bushes 15 and are fed continuously into the heating body 1 where they are progressively brought to molten state. Although being in a non-solid state at the level of the extruding channels 20 and 20', the thermoplastic material therein is pushed downwardly by the solid and cool upper portions of said filaments and are thus extruded through said channels. The molten thermoplastic material is regularly divided therefrom in the distributing groove 14, so that when manually exerting a force on the apparatus by means of the handles 190, 190' and when causing the apparatus to move in the direction of arrow 10 relative to the ski 90, the continuously extruded thermoplastic material stops the cracks in a single run and overspreads the irregularities of the skibase 80 whereby said skibase recovers its initial surface quality. The feeding speed of the polyethylene filaments is determined to ensure a satisfactory extrusion flow by taking into account the thermal power available in the apparatus. A power not greater than 1000 watts is sufficient to deposit a film of polyethylene having a thickness of 0.2 mm at a sweeping rate of about 15 mm per second for a ski of usual width.

With such an apparatus, it is possible to utilize polyethylene or any other thermoplastic material having substantially the same characteristics as the genuine material of the skibase, while offering the advantage of permitting utilization of filaments of said thermoplastic material such as those which are currently commercially distributed. Additionally the changing of filaments having one color to filaments having another color is almost instantaneous, since the apparatus is not quite subject to fouling owing to the small dimensions of the extruding channels 20 and 20' and to the absence of contact between molten polyethylene and any movable part in the apparatus. As in the preceding embodiment, starting of the coating operation, i.e. heating up of the heating body, is very short, while generating, contrary to the known apparatus, a very weak sound level. The apparatus of the invention may be manufactured so as to be very light and easily controlled, even for those which are not skilled in the art of recoating.

There is shown in FIG. 3 an automatic machine for carrying out of method of the invention. In said embodiment, the extrusion head, generally similar to the embodiment shown in FIG. 2, is only illustrated by its casing and the lower wing 12 of the heating body which constitutes the applying and spreading shoe. In said embodiment, however the head is hingedly mounted on a rigid frame 34 and connected to a stationary framework 35 by a guiding rod assembly 36 and a controllably actuated cylinder 37. By means of said cylinder 37, the rigid frame 34 can be moved relative to the framework 34 so as to exert, through the contacting distributing shoe 12, an increased controlled pressure on a ski 90, said ski being, for example, firmly clamped by jaws 91 on a sliding table 92. Increase of the pressure of the shoe 12 on the ski 90 results in a thinner and more regular spreading of the film of thermoplastic material applied onto the skibase. In said embodiment, the supply reels 36 for the polyethylene filaments 5 may be directly mounted above the extrusion device on the framework 35. Displacemant of the sliding table 92 by means of lead screws 93 may be made dependant upon the driving speed of the filament 5 in the heating and spreading apparatus.

Although the present invention has been disclosed in relation with apparatuses utilizing one or two filaments thermoplastic material, it will be understood that the number of the passageways 3 in the heating body 1 may be increased, and that it is accordingly possible to supply the extrusion head with more than three filaments in parallel, the number of the heating cartridges 3 being generally greater than the number of passageways 2, more particularly equal to the number of passageways plus one. It is also possible to make use of polyethylene filaments of a size different from those usually available on sale and to make use of thermoplastic material in the form of a band or of a strip, the passageways 3 having accordingly the form of thin passageways of rectangular cross-sections, the heating cartridges 2 being arranged on both sides of said passageways, the driving of the strips by the toothed wheels being eventually carried out against a biasing guiding plate. The method and the apparatus are not limited to the recoating of flat surfaces, but also apply to cylindrical surfaces, the lower face 7, 70 of the laminating shoe being accordingly shaped to present a contour osculatory of a portion of said cylindrical surface. It is also permitted to use polyethylene in a solid state in a more compact configuration, for instance in the shape of rods or elongated blocks. Moreover, without departing from the scope of the present invention, the driving of the filaments or the strips of the thermoplastic material may be obtained by any mechanical or pneumatical driving device ensuring an automatic, controllable and accurate pushing of the thermoplastic material into the heating body.

It will be understood that modifications and variations of the embodiments of the invention disclosed herein will be resorted to without departing from the spirit of the invention and the scope of the appended claims.

What is claimed is:

1. An apparatus for recoating a thermoplastic surface with a thermoplastic material, which comprises means for continuously supplying thermoplastic material in a solid state, heating and spreading means for coating said thermoplastic material in a molten state on said thermoplastic surface to be coated, said heating and spreading means comprising a metallic heating body having heating resistor means therein and at least one transversing passageway for said thermoplastic material, said passageway having an inlet for introducing said thermoplastic material in a solid state and an opposite outlet, said heating resistor means comprising at least a heating cartridge disposed at the vicinity of said passageway; mechanical means for forwarding the coating material through said passageway, said forwarding means being disposed upstream said passageway with respect to the forwarding direction of the coating material, said mechanical forwarding means comprise at least one cylindrical guiding bush formed with a longitudinally extending opening through which extends a peripheral toothed segment of a toothed wheel, driving means being provided for rotating said toothed wheel and including a ratchet wheel mechanism which cooperates with said toothed wheel to drive said wheel and a reducing gear driving unit; and a projection formed on said heating body forming a spreading structure for spreading said molten thermoplastic material, said projection having a substantially flat contacting surface extending at an angle to said passageway for contacting the surface to be recoated, said contacting surface being formed with a groove into which opens said outlet of said passageway; wherein said heating body and, said forwarding means are supported on a supporting frame slidingly mounted for displacement in a first direction on a stationary framework, actuation means being provided on said stationary framework for bringing said spreading structure in pressure contact with said surface to be treated supported on a supporting structure mounted on said stationary framework for displacement in a second direction substantially perpendicular to said first direction.

2. An apparatus according to claim 1, wherein said actuation means comprises cylinder means for controllably moving said supporting frame and bringing said spreading structure into pressure contact with said surface to be coated on said supporting structure.

* * * * *